United States Patent Office 3,368,906
Patented Feb. 13, 1968

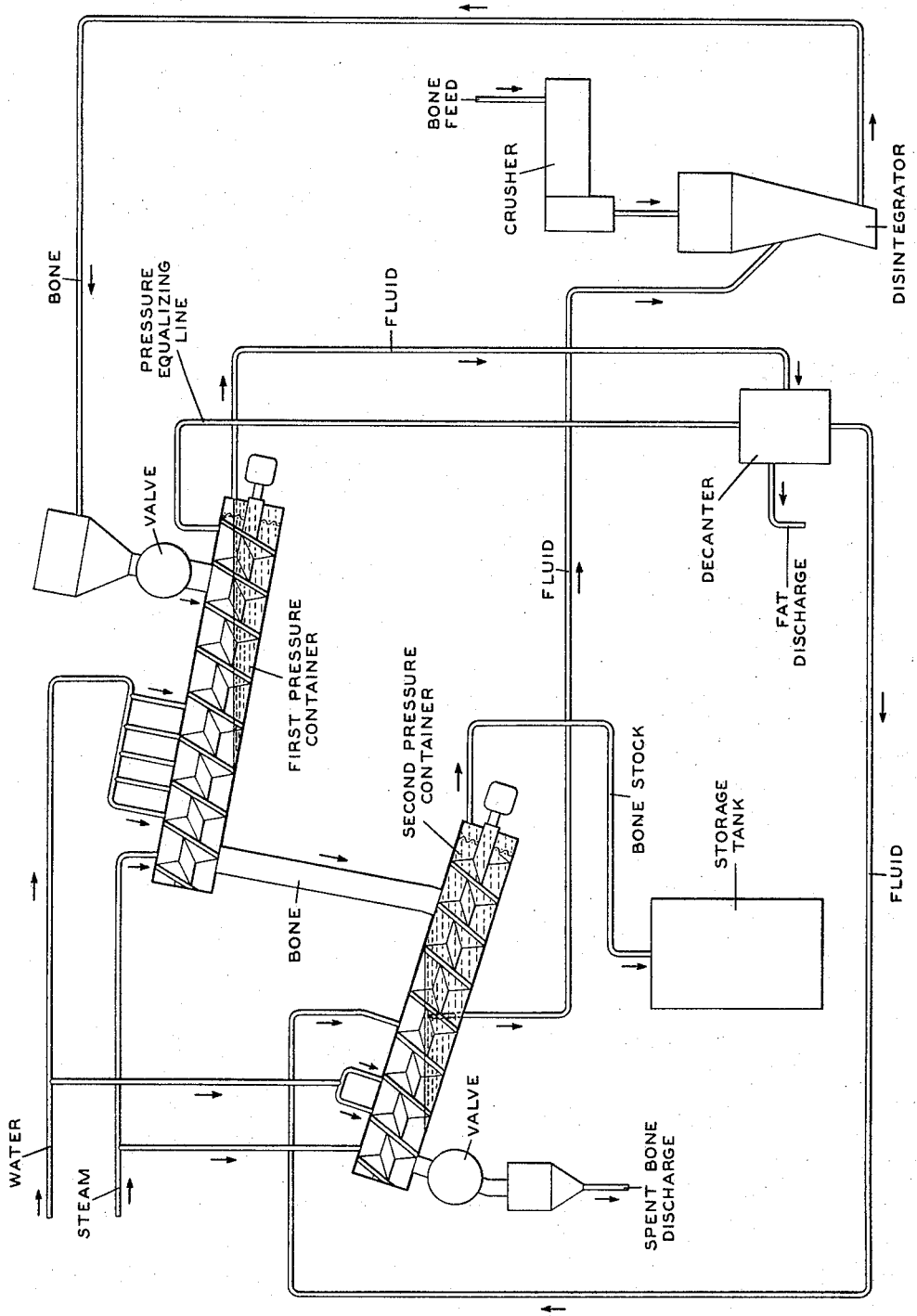

3,368,906
PROCESS FOR PREPARING BONE STOCK
William J. Coffin, Cinnaminson, and Robert W. Hockenbury, Moorestown, N.J., assignors to Campbell Soup Company, Camden, N.J., a corporation of New Jersey
Filed Jan. 17, 1966, Ser. No. 520,989
10 Claims. (Cl. 99—110)

ABSTRACT OF THE DISCLOSURE

A continuous process for extracting flavoring from bones that includes the steps of breaking the bones; feeding the bones in water to a first pressure container in the weight ratio of water to bones of between about 0.5 to 1.5; heating the bones in the first container in the presence of the water for from about five to thirty minutes at a temperature not substantially below 275° F. and not substantially above 325° F. at a pressure at which said water will not boil and solubilizing the flavoring in said bones and forming a flavored liquid with said water and, while heating the bones in the first container feeding the bones in a first direction through the first container and the water in the opposite direction; feeding the bones in the first container into a second pressure container and in a first direction through the second container; withdrawing the flavoring liquid from the first container and feeding the liquid to the second container in a direction opposite to the direction of movement of the bones in the second container; while feeding the bones and the liquid in opposite directions, heating the bones and the liquid in the second container for from about fifteen to forty-five minutes at a temperature of not substantially below 275° F. and not substantially more than 325° F., at a pressure at which the liquid will not boil and solubilizing the flavoring remaining in said bones and forming a further flavored liquid of the remaining flavoring and the flavored liquid and removing the further flavored liquid from the second container.

---

This invention relates to the preparation of flavoring broth or stock and, more particularly, to the preparation of such flavoring broth or stock from bones.

In the preparation of many food products, such as soups, stews, broths, and the like, it is the customary practice to add meat flavoring to the preparation. Such flavoring may be in addition to any meat in the product. One method commonly practiced to obtain such meat flavoring is to cook bones remaining after butchering in commercial meat packing. Usually, this method has been accomplished on a batch basis, has been relatively expensive and slow, has produced a relatively low yield of broth or stock, and the flavoring produced has lacked uniformity and quality.

Uniformity of quality and flavor is of substantial importance to commercial production of food products. From the standpoint of maketing and consumer acceptance, it is important that as little variation as possible exist in the product. This is particularly true with respect to flavor where changes are readily detectable. Flavor, and the maintenance of uniform flavor in daily production of the food product does, to a large extent, determine initial and continued customer acceptance of the product. Where the flavor of the product is, to an appreciable degree, determined by the addition of meat flavored broth or stock, it is important that the flavoring broth or stock be of uniform and consistent quality.

One of the objects of the instant invention is an improved method for producing meat flavored broth or stock from bones.

A further object is to provide such a method in which such broth or stock can be produced continuously.

Still a further object is to provide such a method in which the broth or stock produced will be of uniform and consistent quality.

These and other objects will be more apparent from the following description and the attached drawing of a flow diagram of the process of the instant invention.

In the process of the instant invention, the bones are treated, under pressure, with steam and hot water to hydrolyze and remove the protein, or meat flavoring, from the bones. After the bones have been so treated, they are removed and the protein, or meat flavoring, now contained in the water, is removed as a meat flavored broth or stock.

Substantially all meat, fat, and the like, are removed from the bones by the commercial meat packer. These bones, either fresh or frozen, are crushed and then, preferably, fed to a disintegrator where the particle size of the bones is reduced to such a size that all of the particles will pass through a screen having one-half inch openings. The disintegrated bones are then mixed with liquid at a temperature of about 150° F. to form a slurry.

The slurry is pumped through a pressure transfer valve into the lower end of a first cylindrical pressure vessel mounted with its axis at an angle of approximately 10° to the horizontal.

The first cylindrical pressure vessel has a rotatable screw which turns in a direction to feed the crushed bones from the lower end of the pressure vessel, where the bone slurry is delivered to the vessel through the pressure transfer valve to the upper end of the vessel, where the bones are discharged through a conduit into the lower end of a second cylindrical pressure vessel. The second cylindrical pressure vessel is mounted with its axis at an angle of approximately 20° to the horizontal and is also provided with a rotatable screw which feeds the bones from the lower end of the second cylindrical pressure vessel, where the bones are received from the first vessel, to the upper or elevated end of the vessel. At the upper or elevated end of the second pressure vessel, the spent bones are discharged through a pressure transfer valve and are removed. As the bones are fed through the first and second pressure vessels, the protein, or meat flavoring, is hydrolyzed and removed from the bones and withdrawn from the system.

The process of the instant invention utilizes a counterflow arrangement. Such counterflow arrangement is employed in each of the pressure vessels. The crushed bones enter the two cylindrical pressure vessels at the lower end of the vessels and are discharged from the upper, or elevated, end of the vessels. Water, preferably preheated, is introduced into both pressure vessels at the upper, or elevated, end of the vessels and liquid is removed from the lower end of the vessels. The liquid removed from the lower end of the first vessel is fed into the second vessel. The liquid removed from the lower end of the second vessel, which contains the protein or meat flavoring at the required concentration, is fed to storage.

Both pressure containers are maintained under pressure. Heat is applied to the pressure containers to heat the liquid and the bones in the containers to a temperature of not substantially less than 275° F. and not substantially more than 325° F. The pressure at which the containers are to be maintained is, of course, determined by the temperature of the liquid. In carrying out the instant process, it is important that the liquid not boil. The process can be carried out at temperatures above 325° F. However, the process time and the pressures required are such that it is preferred not to extend 325° F.

In carrying out the instant process, it is preferred to heat the liquid and bones in the containers by feeding steam into the upper end of each container. Additionally, each pressure container is provided, at its elevated end, with a spray head for the addition of fresh preheated water.

The lower end of each angularly disposed pressure container contains hot liquid and, the upper end, steam. The disintegrated, or crushed, bones are first submerged in the liquid and, as they are fed up the containers by the screws, pass from the water into a steam atmosphere. While in the steam atmosphere, the bone particles are sprayed with hot water. The bone particles are in the first container for from about 5 to about 30 minutes, and in the second container for from about 15 to about 45 minutes. The time the bone particles remain in each container is determined by the temperature and pressure of the container and the concentration of bone stock required in the liquid being removed from the container and is regulated by the speed of the screw in the container. Preferably, the speed of the screw can be regulated.

A certain amount of fat is contained in the bone slurry fed into the first pressure container. The liquid withdrawn from the first container is decanted to remove fat before the liquid is fed into the second pressure container. Fat withdrawn in decanting is removed from the system. The decanter is connected to the first pressure container to equalize the pressure in the decanter with the pressure in the first container.

As aforestated, the liquids are removed from the first and second cylindrical pressure containers at the lower end of the containers. Each container, at its lower end, has a screen, or plate, with openings of a size that prevent the bone particles from passing out with the liquid. The liquid is withdrawn at the upper end of the end wall of the first container and at the end wall of the second container.

By regulating the slurry infeed, the steam infeed, and the infeed of fresh preheated water, the liquid level in each of the containers is regulated. In the first cylindrical pressure container, the liquid level is maintained so that the liquid withdrawn from the first cylindrical pressure container for decanting and feeding to the second pressure container is withdrawn at the surface of the liquid. Because fat passing into the first container in the bone slurry is nonsoluble in water and rises, the fat is removed from the first container as the liquid is withdrawn.

The liquid in the second container is maintained at a higher level. The liquid surface in the second vessel is well above the point where the meat flavored liquid broth, or stock, is withdrawn from the end wall of the second container and stored.

In carrying out the process of the instant invention, a small amount of liquid stock is withdrawn just below the liquid level in the second container and is fed to the disintegrator to form the bone slurry. Any fat that may have passed into the second container is withdrawn with the slurrying liquid.

The process of the instant invention can be carried out with a wide variety of bones, such as, beef, pork, turkey, chicken and mutton bones. The flavor of the withdrawn stock, or broth, will, of course, depend on the bones processed. Where a beef flavoring broth or stock is desired, beef bones will be processed. Similarly, pork or chicken bones will be processed.

The process of the instant invention is adapted for continuous operation. Raw bones are fed into the system at a uniform rate, and the spent bones and liquid broth, or stock, are withdrawn at uniform rates. By regulating the speed of the screw conveyors, the temperature and pressure in the pressure containers, the steam flow and the flow of the hot water spray, the amount and quality of the meat flavoring broth, or stock, can be regulated. To some extent, at least, regulation will depend on the type and quality of bones being processed.

In carrying out the process of the instant invention, the exposure time of the liquid fraction containing soluble bone solids to the high temperature digestion must be controlled to achieve the proper degree of protein, or meat flavoring, hydrolysis. A retention time of not substantially less than five minutes and not substantially more than twenty minutes in the first pressure container, of not substantially less than thirty minutes and not substantially more than ninety minutes in the decanter, and not substantially less than fifteen minutes and not substantially more than seventy minutes in the second pressure container, when the liquid is maintained at a temperature of approximately 300° F. and the bones are retained in the respective pressure containers, as noted above, have proven most satisfactory. The exposure time of the bones in the pressure containers removes the fat and hydrolyzes the insoluble bone materials to a point where they become soluble and are extracted. The continued application of heat to the extracted soluble fractions in the liquid continues the hydrolysis of the protein to a point where satisfactory flavor and other desired quality characteristics, such as clarity of the broth, or stock, are developed. Different characteristics can be developed in the broth, or stock, by varying the temperature and retention times.

The water weight to bone weight in the instant process is controlled by the amount of water added to the bones by the rinse water and steam added to the first and second pressure containers. Preferably, the ratio of weight of liquid to weight of raw bones in the first pressure container is maintained between about 0.5 to 1.5 and, in the second pressure container, between about 1.5 to 3.5.

The fat is removed from the decanter by gravity separation. Once the fat is removed, the liquid removed from the first pressure container to the decanter is fed to the second pressure container where it acts as a solvent to rinse and leach protein from the bones in the second pressure container, and becomes a part of the meat flavored broth, or stock, removed from the second container. A fat retention time in the decanter of approximately 30 to 90 minutes under substantially quiescent conditions is satisfactory to separate the fat and liquid.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A continuous process for extracting flavoring from bones the steps comprising, breaking the bones, feeding the broken bones and water in the weight ratio of water to bones of between about 0.5 to 1.5, to a first pressure container, heating said broken bones in said first container in the presence of water from about five to thirty minutes at a temperature not substantially below 275° F. and not substantially above 325° F., at a pressure at which said water will not boil, and solubilizing the flavoring in said bones and forming a flavored liquid with said water and, while heating said bones, feeding said bones in a first direction through said first container and said water in said first container in the opposite direction, transferring said bones after they are fed through said first container into a second pressure container, feeding said bones in a first direction through said second container, withdrawing said flavored liquid from said first container and feeding said liquid to said second container in a direction opposite to said first direction, while feeding said bones and said flavored liquid in opposite directions through said second container, heating said bones and said flavored liquid in said second container for from about fifteen to forty-five minutes at a temperature of not substantially below 275° F. and not substantially above 325° F. at a pressure at which said liquid will not boil and solubilizing the flavoring remaining in said bones and forming a further flavored liquid of said remaining flavoring and said flavored liquid and removing said further flavored liquid from said second container.

2. A process as recited in claim 1 in which said bones in said first and second containers are sprayed with hot water.

3. A process as recited in claim 2 in which said flavored liquid removed from said first container is decanted before said liquid is delivered to said second container and in which, during said decanting, fat is removed from said liquid.

4. A process as recited in claim 3 in which said bones are crushed to a particle size wherein substantially all of said particles will pass through a screen having one-half inch openings.

5. A continuous process for extracting flavoring from bones the steps comprising, breaking the bones, slurrying said broken bones, feeding said slurry to the lower end of a first pressurized container and immersing said bones in hot water in the lower end of said first container in the weight ratio of water to bones of between about 0.5 to 1.5, feeding said bones in a first direction from the lower end of said first container to the upper end of said first container and, while feeding said bones in said first direction, heating said bones and said water for from about five to thirty minutes at a temperature of not substantially below 275° F. and not substantially above 325° F., at a pressure at which said liquid will not boil, removing said bones from said water in the lower end of said first container into a steam atmosphere in the upper end of said first container, discharging said bones from the upper end of said first container into the lower end of a second pressurized container and immersing said bones in hot liquid in the lower end of said second container in the weight ratio of water to bones of between about 1.5 to 3.5, feeding said bones in a first direction from the lower end of said second container to the upper end of said second container and, while feeding said bones in said direction, heating said bones and said liquid for from about fifteen to forty-five minutes at a temperature not substantially below 275° F. and not substantially above 325° F., at a pressure at which said liquid will not boil, removing said bones from said liquid in the lower end of said second container into a steam atmosphere in the upper end of said second container, discharging said bones from the upper end of said second container and, while feeding said bones in said first direction through said first and second containers, circulating said water and said liquid in said containers in the direction opposite to the feed of said bones and withdrawing from the lower end of said first and second containers a flavored liquid.

6. A process as recited in claim 5 in which said flavored liquid withdrawn from the lower end of said first container is fed into the upper end of said second container.

7. A process as recited in claim 6 in which said flavored liquid is decanted to remove fat from said liquid before said liquid is fed into said second container.

8. A process as recited in claim 6 in which said bones in said first and second containers are sprayed with hot water.

9. A process as recited in claim 8 in which said flavored liquid is retained in said first container for not substantially less than five minutes and not substantially more than twenty minutes and in said second container for not substantially less than fifteen minutes and not substantially more than seventy minutes.

10. A process as recited in claim 9 in which said fat is retained in said decanter for not substantially less than thirty minutes and not substantially more than ninety minutes.

References Cited

UNITED STATES PATENTS 2,622,027   12/1952   Torr _____ 99—7 X

OTHER REFERENCES

Binsted et al.: "Soup Manufacture," 1940, published by Food Trade Press, Ltd., London, pages 4 to 8, inclusive.

HYMAN LORD, *Primary Examiner.*